(12) United States Patent
Kokko et al.

(10) Patent No.: US 6,222,006 B1
(45) Date of Patent: Apr. 24, 2001

(54) WET STRENGTH THERMOSETTING RESIN FORMULATIONS AND POLYAMINAMIDE POLYMERS SUITABLE FOR USE IN THE MANUFACTURE OF PAPER PRODUCTS

(75) Inventors: Bruce Jerome Kokko, Neenah; Elroy Wayne Post, Oshkosh, both of WI (US)

(73) Assignee: Fort James Corporation, Deerfield, IL (US)

( * ) Notice: Subject to any disclaimer, the term of this patent is extended or adjusted under 35 U.S.C. 154(b) by 0 days.

(21) Appl. No.: 09/129,304

(22) Filed: Aug. 5, 1998

Related U.S. Application Data

(63) Continuation-in-part of application No. 08/910,638, filed on Aug. 13, 1997, now abandoned, and a continuation-in-part of application No. 09/018,196, filed on Feb. 4, 1998, now abandoned.

(51) Int. Cl.$^7$ ............................ C08G 69/26; C08G 65/00; C08L 77/06; C08L 79/00; D21H 11/00
(52) U.S. Cl. ...................... 528/332; 528/322; 528/331; 528/335; 528/339.3; 528/342; 528/403; 525/430; 525/435; 525/436; 524/606; 524/608; 524/800; 524/802; 524/842; 162/157.6; 162/158; 162/164.1; 162/164.3; 162/164.6; 162/168.1; 162/168.2; 162/183; 162/202
(58) Field of Search .................................. 528/322, 331, 528/332, 335, 339.3, 403, 342; 524/606, 802, 608, 800, 842; 525/430, 435, 436; 162/157.6, 158, 164.6, 164.3, 164.1, 168.1, 168.2, 183, 202

(56) References Cited

U.S. PATENT DOCUMENTS

| | | |
|---|---|---|
| 3,655,506 * | 4/1972 | Baggett .................. 162/164 |
| 3,992,251 | 11/1976 | Lipowski . |
| 4,708,772 * | 11/1987 | Maslanka .................. 162/164.3 |
| 4,853,431 * | 8/1989 | Miller ...................... 524/608 |
| 5,017,642 * | 5/1991 | Hasegawa et al. .................. 524/608 |
| 5,019,606 * | 5/1991 | Marten et al. ..................... 523/414 |
| 5,189,142 * | 2/1993 | Devore et al. ..................... 528/339.3 |
| 5,239,047 * | 8/1993 | Devore et al. ..................... 528/339.3 |
| 5,364,927 * | 11/1994 | Devore et al. ..................... 528/339.3 |
| 5,373,087 * | 12/1994 | Weaver, Jr. et al. ................. 528/335 |
| 5,466,337 * | 11/1995 | Darlington et al. ............... 162/164.3 |
| 5,567,798 * | 10/1996 | Dulany et al. ....................... 528/332 |
| 5,585,456 * | 12/1996 | Dulany et al. ....................... 528/332 |
| 5,644,021 * | 7/1997 | Maslanka ............................ 528/336 |
| 5,668,246 * | 9/1997 | Maslanka ............................ 528/336 |
| 5,714,552 * | 2/1998 | Bower ................................ 525/420 |
| 5,786,429 * | 7/1998 | Allen ................................. 525/430 |

FOREIGN PATENT DOCUMENTS

| | | |
|---|---|---|
| 0349935 | 1/1990 | (EP) . |
| 0374938 | 6/1990 | (EP) . |
| 0488767 | 6/1992 | (EP) . |
| 0493757 | 7/1992 | (EP) . |
| 0802215 | 10/1997 | (EP) . |

* cited by examiner

*Primary Examiner*—P. Hampton-Hightower
(74) *Attorney, Agent, or Firm*—Nixon Peabody LLP

(57) ABSTRACT

An aqueous formulation of a high solid content fully functional thermosettable wet strength resin designed for use in the manufacture of paper products is disclosed. The wet strength resin is the product of reaction of an epihalohydrin and an end-capped polyaminamide polymer. The thermosetting wet strength resins are useful in the manufacture of improved absorbent paper products such as bathroom tissues, facial tissues, napkins, towels, and paperboard products such as dairy cartons and bag paper.

63 Claims, 4 Drawing Sheets

WET STRENGTH THERMOSETTING RESIN FORMULATIONS AND POLYAMINAMIDE POLYMERS SUITABLE FOR USE IN THE MANUFACTURE OF PAPER PRODUCTS

RELATED PATENT APPLICATIONS

This application is a continuation in part application of Ser. No. 08/910,638 filed on Aug. 13, 1997 and Ser. No. 09/018,196 filed on Feb. 4, 1998 now both abandoned.

BACKGROUND OF THE INVENTION

In the paper industry polyaminamide-epichlorohydrin (PAE) resins are used for developing wet strength in paper products. These resins are described in U.S. Pat. Nos. 2,926,154 and 5,644,021. In general, PAE resins are shipped to the paper mills at a 12 weight percent solution in water. The use of these resins is problematic since, as formulated in the prior art, unacceptable amounts of organic chloride impurities are produced which contribute to the overall environmental problems of certain paper mills. To overcome these problems, extensive research is being conducted to reduce the organic chlorine impurities in the papermaking process and to improve the efficiency of the papermaking operations. Prior art PAE resins have to be shipped in dilute form to the mills and this increases costs to the mill since, in effect, the mill is paying shipping costs for transporting water.

The art has been trying to increase the solids content of an aqueous PAE resin mixture that is shipped to the mill so that freight is not paid on water and inactive resin. Prior art aqueous PAE formulations having a solids content of 20 to 29 weight percent are known but are not preferred for commercial operations since these resins contain a very high amount of organic chloride impurities detrimental to the environment. PAE resins having a solids content in the range of about 40 weight percent in an aqueous formulation have been prepared but these resins are not fully functional. Fully functional in the PAE resin field is defined as a PAE resin having a sufficiently high molecular weight and azetidinium content to provide wet strength equal to or greater than that achieved by prior art PAE at resin concentrations of less than 35 weight percent (usually 12 weight percent). As a practical matter, a fully functional PAE resin of this invention is a resin controlled to exhibit a PAE concentration in excess of 35 weight percent; a Z average molecular weight in excess of 300,000 grams per mole and an azetidinium moiety content in excess of about 1.4 milliequivalents per gram of solids. Usually the resin concentration of this invention is between 35 and 45 weight percent, but upon dilution and other process modifications, the resin concentration can suitably vary from 12 to 45 weight percent advantageously from 12 to 35 weight percent. This resin also comprises less than seven weight percent of residual, non polymeric, chlorinated, organic compounds based on the total solids content of the wet strength formulation and does not jell for four weeks after formulation. This type of a PAE resin is unknown to the prior art.

Our novel thermosettable wet strength resin comprises the product of reaction of an epihalohydrin and an end-capped polyaminamide polymer. The advantageous properties of the PAE resins of this invention are achieved because the epihalohydrin is reacted with an end capped polyaminamide polymer. The end capped polyaminamide polymer in conjunction with epihalohydrin provides a thermosetting resin which has a shelf life in excess of four weeks at a temperature of 25 to 38° C. and has a solids content of 12 to 45 weight percent. The shelf life is much greater at temperatures below 25° C. The shelf life is also greater at solids content of less than 35 weight percent but for optimum commercial use the solids content should be in the range of 35 to 45 weight percent. We define a thermosetting resin as a resin that cross-links through reactive groups inherent to the resin to form structures that cannot be melted or dissolved in water.

Prior art PAE resin formulations are not suitable for modern applications even though the PAE solids content is about 20–29 weight percent since these resins have very high levels of residual (non-polymer) chlorinated organic moieties. This is also true for the PAE resin formulation disclosed in U.S. Pat. No. 5,644,021, which is the most recent prior art reference. Therefore these products are generally environmentally unacceptable in the paper manufacturing process. For a resin to be fully functional as defined above, the resin also has to have a reasonable shelf life. U.S. Pat. No. 5,249,142 discloses a low chlorine PAE product which has a short shelf life and lower wet strength efficiency and is not prepared from a chain terminated polyaminamide polymer. Shelf life is the time span between the manufacture of the PAE resin and the point the resin jells. At a minimum this should be at least three weeks, preferably four or more weeks. The prior art does not disclose or suggest suitable methods for the preparation of a PAE type resin at a solids content in excess of 35 weight percent that is fully functional (as described herein) and has a shelf life of about four weeks.

The present invention provides novel end-capped polyaminamide polymers which when reacted with epichlorohydrin produce PAE resins suitable for use in aqueous thermosettable wet strength resin formulations exhibiting a shelf life of about four weeks at a solids content in excess of 35 weight percent at a temperature of about 25 to 38° C. These resins have a Z molecular weight of about 300,000 grams per mole to 700,000 grams per mole and have an azetidinium moiety content of at least 1.4 milliequivalents. Preferably the azetidinium moiety content is in the range 1.5–1.7 and higher milliequivalents per gram of solid in the thermosettable wet strength resin formulation.

The process for the manufacture of the PAE to produce the high solids content, long shelf life, thermosettable wet strength resin formulations of this invention advantageously produce low levels of non polymeric, chlorinated, organic compounds in the PAE resin formulations, usually less than seven weight percent, preferably less than six weight percent of the total solids. High solids PAE resins having such a low percentage of non-polymeric, chlorinated, organic compounds are not produced by prior art processes.

DETAILED DESCRIPTION

Figure 4:
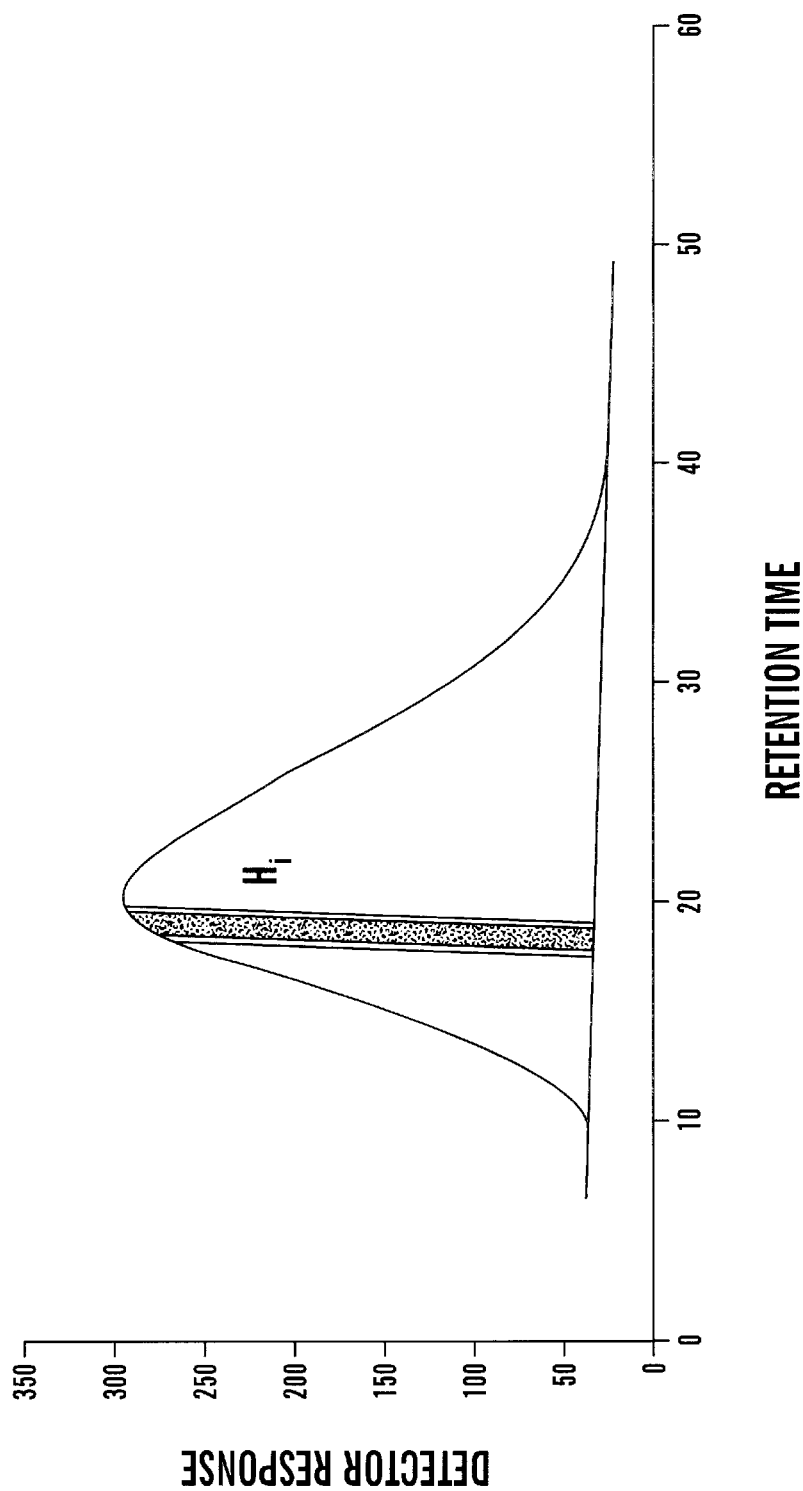
FIG. 4 is a graph illustrating a typical GPC trace used in the determination of the molecular weights of the PAE resins of this invention.

To overcome a long felt need, we have discovered an acidic aqueous formulation of a high solids content fully functional thermosettable wet strength resin formulation suitable for use in the manufacture of paper products characterized that the resin is prepared from end-capped polyaminamide polymers and epihalohydrin. The wet strength resin formulation has a solid PAE content of at least 35 weight percent comprising a PAE resin having a Z average molecular weight of at least 300,000 grams per mole up to 700,000 grams per mole. The molecular weight is determined by GPC; a typical GPC trace is shown in FIG. 4. The wet strength resin has a solid PAE content of about 35 to 45 weight percent, but in some formulations the PAE content is controlled to be in the 12 to 45 weight percent range.

The various polymer molecular weight averages are calculated from the GPC chromatogram (FIG. 4) and the corresponding calibration curve for the polymer standards (i.e., polyvinylpyridine) according to the following equation:

$$M_X = \Sigma[H_i]M_i^n / \Sigma[H_i]M_i^{n-1}$$

where $H_i$ is the concentration (mass/volume) of polymers having $M_i$ molecular weight in the area of retention values for a slice, i, of the GPC trace and $M_X$ is equal to $M_N$, $M_W$ and $M_Z$ when n is equal to 1, 2, or 3 respectively. Typically about 100 slices (i.e., i =100) of the GPC trace are taken. The molecular weight at each slice is obtained from the calibration curve of molecular weights of known polymer standards versus retention time. The concentration at each slice is proportional to the integrated area of the slice.

To be fully functional, the PAE resin suitably exhibits an azetidinium moiety content in excess of about 1.4 milliequivalents per gram of solids. Advantageously, the azetidinium moiety content in the PAE resin of this invention is about 1.4 to 1.7 or higher milliequivalents per gram of solid PAE. Advantageously, the PAE resin should contain less than seven weight percent of organic chloride residues; preferably less than six weight percent based on the weight of the total solids. A key feature of the PAE wet strength resin formulation of this invention is that at a solids content of about 35 to 45 weight percent, the formulation does not jell within four weeks of preparation. Usually the formulation has a shelf life in excess of four weeks. At a concentration of 12 to 35 weight percent, the shelf life is extended even further. The shelf life has been measured for temperatures of about 25 to 38° C. At lower temperatures the shelf life is much higher.

To obtain the fully functional PAE resin and the strength enhancing formulation of this invention, a new end capped polyaminamide polymer capable of further in situ reaction with epichlorohydrin has been prepared. This polymer includes the following chain or branch terminators:

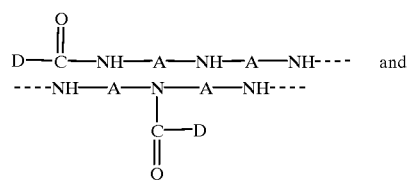

and mixtures of these wherein A and D are the same or different hydrocarbon radicals selected from the group of aliphatic hydrocarbon radicals having 1 to 9 carbon atoms and aromatic hydrocarbon radicals having 6 to 12 carbon atoms. Suitably D is selected from the following monovalent hydrocarbon radicals: phenyl, naphthyl, methyl, ethyl, propyl, butyl, pentyl, hexyl, heptyl, octyl, and nonyl. Advantageously, A is selected from the following divalent hydrocarbon radicals: phenylene, naphthylene, methylene, ethylene, propylene, butylene, pentylene, hexylene, heptylene, octylene, and nonylene. The radicals are advantageously straight chain or branched. The end capped polyaminamide has the formula set forth herein below, however, it should be understood that the formula represents only one design of the polymer since the distribution of the actual polyamino moieties and polymer end groups is totally random.

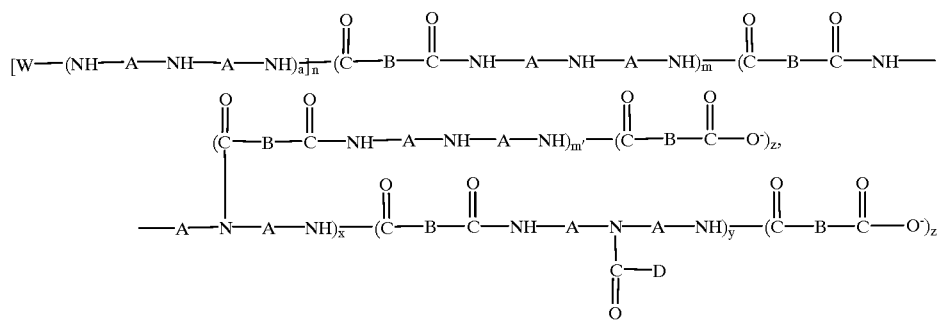

A has a value of 1.0 to 0.9 when W is H; n has a value of 0.5 to 1.5 when W is

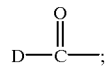

m and m' have a combined value of 3.0 to 11.0; x has a value of 0 to 2.0; y has a value of 0 to 1.3; z and z' have a combined value of 0.6 to 3.2; wherein W is H or D

and D is a monovalent hydrocarbon radical selected from the group of aliphatic hydrocarbon radicals having 1 to 9 carbon atoms or aromatic hydrocarbon radicals having 6 to 12 carbon atoms and mixtures of these. Suitably D is selected from the following monovalent hydrocarbon radicals: phenyl, naphthyl, methyl, ethyl, propyl, butyl, pentyl, hexyl, heptyl, octyl, and nonyl and their isomers; and A and B are divalent hydrocarbon radicals selected from the group of aliphatic hydrocarbon radicals having 1 to 9 and 0 to 9 carbon radicals, respectively, or aromatic radicals having 6 to 12 carbon atoms and mixtures of these Advantageously A and B are selected from he following divalent hydrocarbon radicals: phenylene, naphthalene, methylene, ethylene, propylene, butylene, pentylene, hexylene, heptylene, octylene, and nonylene, and their isomers.

In the event D is an aliphatic radical, a has a value of about 0.9 to 1.1, n has a value of 1.0 to 1.5, and m and m' have a combined value of 3 to 10, x has a value of 0 to 1.1, y has a value of 0 to 0.3, and z and z' have a combined value of 0.6 to 1.3.

In the event D is an aromatic radical, a has a value of 1.1 to 1.9, n has a value of 0.5 to 0.8, m and m' have a combined value of 3.0 to 9.0, x has a value of 0 to 2.0, y has a value of 0.7 to 1.3, and z and z' have a combined value of 0.7 to 3.2.

PAE resins are prepared in a two-step process. The first step involves the condensation polymerization of a diacid or diester with a polyalkylenepolyamine. Examples of diacids that can be used are adipic acid, glutaric acid, oxalic acid, sebacic acid, itaconic acid, and azelaic acid, etc., or mixtures thereof. This list is representative only, and should not be considered comprehensive or otherwise limiting. The ester versions of any one of the above diacids or those not listed by way of example can also be used. For example, dimethyladipate, dimethylglutarate, and dimethylsebacate, etc., or mixtures thereof. Furthermore, the applicable esters are not limited to those versions based on methanol, but other alcohols such as ethanol, propanol, butanol, etc., or mixtures thereof are suitably used. Examples of polyalkylenepolyamines are diethylenetriamine, triethylenetetraamine, dipropylenetriamine or mixtures thereof. The polymerization of the diacid or diester and the polyalkylenepolyamine results is an polyaminamide polymer of the following general structure:

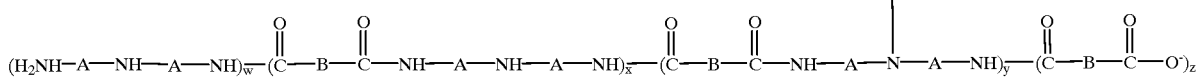

A and B have the values set forth herein above and W, X, Y, and Z have the following representative values: 0.8–1.2, 16–18, 0–1, 1.2–1.8, respectively. The second step in making a PAE resin is the reaction between the polymer and an epihalohydrin such as epichlorohydrin. This reaction serves to build the PAE molecular weight and impart both the cationic nature and thermosettability to the PAE resin. The functional group that results from the reaction of the polyaminamide polymer with the epihalohydrin that is responsible for the cationic charge and the thermosettability of the PAE resin is the azetidinium group:

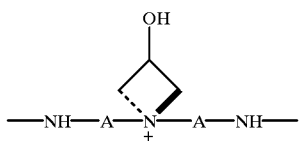

In addition to the azetidinium groups, chlorohydrin pendent groups and glycol pendent groups also form during the reaction between epichlorohydrin and the end-capped polyaminamide polymer:

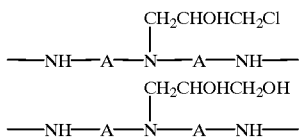

Furthermore, unless vast excesses of epichlorohydrin are employed, there is always a significant level of unreacted secondary amines left in the final PAE resin product:

The molecular weight of the PAE resin is increased through cross-linking reactions that occur during the reaction of the epichlorohydrin and the polyaminamide polymer. Not to be limited by theory, but it is postulated that these cross-links result from the reaction between either secondary or tertiary amines and azetidinium groups:

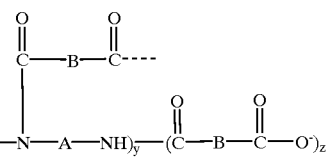

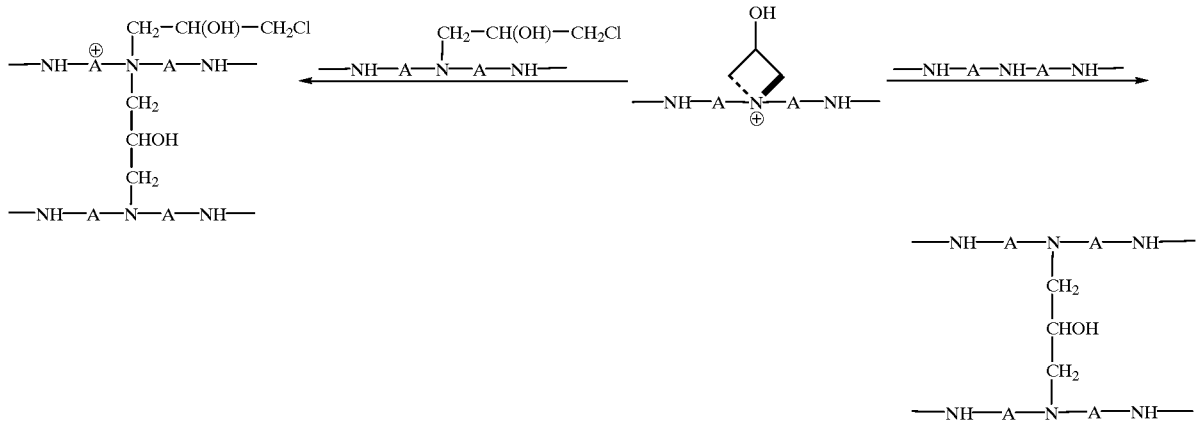

A is a divalent hydrocarbon radical having 1 to 9 carbon atoms for an aliphatic chain or 6 to 12 carbon atoms for an aromatic moiety. It is well known to the art that the above approach to a PAE resin cannot be practiced at high solids (e.g., >35%) without either compromising the functionability of the resultant PAE resin or shortening its shelf life to non-practicable levels. The reason is that at high solids the cross-linking reactions occur too quickly to allow time for sufficient formation of azetidinium groups prior to gelation of the PAE resin. Consequently, at high solids, PAE resins having high azetidinium contents but very low molecular weight, or very low azetidinium contents but high molecular weight can be prepared. Unfortunately, in neither of these conditions is the PAE resin fully functional. At medium solids (i.e., 20–29 wt %), the cross-linking reactions can be slowed sufficiently to allow the attainment of both high molecular weight and high azetidinium content without gelation by simply adding a large excess of the epihalohydrin. This limitation has been demonstrated in U.S. Pat. No. 5,644,021. This is the reason why prior art medium solids resins have high levels of residual (non-polymer) chlorinated organics detrimental to the environment. The excess epihalohydrin is hydrolyzed to water miscible forms such as 1,3-dihalopropanol, 3-halo-1, 2-propane diol, etc., and discharged into the wastewater of the mill. This is environmentally questionable and the present invention overcomes this serious deficiency of the prior art high solids strength enhancing resins. For PAE resin concentrations in excess of 35 weight percent, the use of excess epihalohydrin is not practical since the resulting PAE resins have an impracticably short shelf life. Another way some PAE producers have lessened the impact of the cross-linking reaction at high solids is by shortening the synthesis time of the polyaminamide. Thus, more cross-linking must occur to reach a given molecular weight of PAE resin. This prior art approach only provides PAE resins having high azetidinium contents but low molecular weights. Consequently, the resultant PAE, while having practicable shelf stability, is not fully functional.

The present invention overcomes the above mentioned barriers to a fully functional and shelf stable PAE resin at high solids by utilizing the surprising discovery that polyaminamide, whose molecular weights are reduced via the use of chain terminators, can be treated with levels of epihalohydrins, in the range of those used in preparing low solids (12%) PAE resins, and yield fully functional PAE resins at high solids (35–45 weight percent) having practicable shelf lives (4 or more weeks) and low levels of chlorinated organic pollutants (below 7 weight percent based on the solids content of the wet strength agent formulations).

Suitably the end capped polyaminamide polymers of the present invention, are synthesized by the condensation polymerization of a mixture of a diacid or diester and a monoacid or monoester with a polyalkylenepolyamine. However, alternatively, the following classes of compounds are suitable chain terminators for the present invention:

1) Primary acyclic linear or branched aliphatic halides or tosylates:

RX wherein X is halogen or tosylate and R is an acyclic linear or branched aliphatic moiety;

2) Primary cyclic aliphatic alkylenyl halides and tosylates:

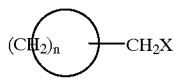

wherein X is halogen or tosylate group and n is an integer of about 2 to 8.

3) Primary arenyl halides and tosylates:

ArCH$_2$X wherein X is halogen or tosylate group and Ar is an aryl moiety.

4) Monoepoxides:

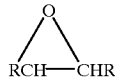

where the R groups are the same or different, and are arenyl, aryl, cyclic or acyclic aliphatic, or hydrogen, or mixtures thereof.

6) Cyclic or acyclic aliphatic or aryl or arenyl isocyanate:

RNCO

7) Cyclic or acyclic aliphatic or aryl or arenyl isothiocyanate:

RNCS

8) Anhydrides:

where R, and R' are the same or different, aryl, arenyl, linear or cyclic aliphatic. Note that when using anhydrides, if the carboxylic acid, released upon first reaction of anhydride with the terminal amine of the polyaminamide polymer, is sufficiently non-volatile enough to then act as an additional chain terminator, then the amount of anhydride used must be adjusted accordingly.

9) Acyl halides:

where R is arenyl, aryl, cyclic or acyclic aliphatic.

10) Alkynes:

where R and R' are the same or different, aryl, arenyl, linear or cyclic aliphatic.

11) Conjugated dienes:

where R and R' are the same or different, aryl, arenyl, linear or cyclic aliphatic.

The monoacid or monoester serves as the chain terminator. The function of the latter is to reduce the molecular weight of the polyaminamide polymer. While, not to be limited by theory, it is believed that the chain terminator functions in the present invention by reducing molecular weight while maintaining the polydispersity and the level of active amine endgroups characterizing prepolymers made without the chain terminators; that is, prepolymers of the prior art. Polydispersity is a measure of the distribution of polymer molecular weights; where, the greater the polydispersity, the greater the range of polymer molecular weights.

The diacids or diesters applicable to the present invention are any known to the art to be useful when preparing PAE resins. For example, adipic acid, glutaric acid, itaconic acid, sebacic acid, oxalic acid, azelaic acid, etc., or mixtures thereof. The ester versions of any of the known diacids are also applicable to the present invention and include, by way of example only, dimethyladipate, dimethylsebacate, dimethylitaconate, dimethylazelate, dimethyloxalate, dimethyl glutarate, etc, or mixtures thereof. The diesters applicable to the present invention are by no means limited to those made with methanol, but can be prepared by any alcohol known to the art. For example, ethanol, propanol, butanol, pentanol, hexanol, isopropanol, benzyl alcohol, phenol etc., and mixtures thereof.

The chain terminator can be any monoacid or ester known to the art that is compatible with the chosen diacid or diester and polyalkylenepolyamine mixture, and which has a boiling point sufficiently high for the reactor that is to be employed. Thus, for pressurized reactors monoacids or monoesters of quite low boiling points are suitably employed. It is preferable to use a monoacid or monoester that can be kept in the reaction phase and therefore enter into and control the condensation polymerization reaction.

When a chain terminated polyaminamide polymer is prepared with a diacid a monoacid chain terminator should be used in the practice of the present invention. Examples of such chain terminators are linear or branched aliphatic moieties (e.g., hexanoic acid, 4-methylpentanoic acid, etc.), cydic aliphatic moieties (e.g., cyclohexylcarboxylic acid, etc.), arenyl carboxylic acids (e.g. phenylacetic acid etc.), and aromatic acids (e.g., benzoic acid, etc.).

When a chain terminated polyaminamide polymer is prepared with a diester; a monoester chain terminator should be used. Examples of such chain terminators are ester versions of any of the monoacid terminators applicable to the present invention (as described above). These esters can be prepared from any alcohol known to the art. For example, methanol, ethanol, propanol, butanol, isopropanol, benzyl alcohol, phenol etc., or mixtures thereof.

The preferred chain terminators are the aliphatic or arenyl carboxylic acids or esters.

The preferred add-on level of chain terminator to be used when preparing the chain terminated polyaminamide polymer applicable to the present invention, ranges from about 5.0 to about 15 mole percent (mol%) of the total active carbonyl content (i.e., sum of the total moles of carbonyls of carboxylic acid or ester groups in the mixture); with the more preferred range being from about 7.5 to about 12.5 mol %, and the most preferred range being from about 9 to about 11 mol % of total active carbonyl content.

The polyalkylenepolyamine applicable to the present invention is any of the type useful when preparing PAE resins known to the art. These are generally characterized by having two primary amines and at least one secondary amine. For example, diethylenetriamine, dipropylenetriamine, triethylenetetraamine, etc., or mixtures thereof.

The PAE resin is prepared by suitably adding an amount of epihalohydrin to an aqueous solution of the chain terminated polyaminamide polymer and allowing it to react with agitation at a given temperature for a controlled time to bring the azetidinium content to a predetermined high level, and the viscosity to a predetermined high level calculated to produce the resultant high solids PAE resin. This resin, after quenching the reaction by lowering the pH and cooling, is fully functional; where, fully functional means the high solids PAE resin, of the present invention, has sufficiently high molecular weight and azetidinium content to provide wet strength equal to or greater than that achieved by a commercial lower solids (<35 wt %) resin at equal add-on.

By way of direction only, for a reaction between a chain terminated polyaminamide polymer and epichlorohydrin conducted at 60° C., a reaction time of about at least 90 min. is desirable, with a more preferred duration being about at least 110 min., and a most preferred duration being about at least two hours prior to quenching by cooling and lowering the pH of the resultant PAE resin.

By way of direction only, the desired amount of epihalohydrin added ranges between from about 0.90 to about 1.35 equivalents based on the total actives of the end-stop polyaminamide polymer and will depend to some degree on the type of chain terminator used. For example, with an aliphatic chain terminator the preferred range will be from about 0.90 to about 1.20 equivalents, with a more preferred range being from about 1.00 to about 1.15, and the most preferred range being from about 1.05 to about 1.12 equivalents based on the total actives of the chain terminated polyaminamide polymer. Whereas, for an aromatic chain terminator, the preferred range will be from about 1.00 to about 1.35 equivalents, with a more preferred range being from about 1.15 to about 1.30, and the most preferred range being from about 1.17 to about 1.25 equivalents based on the total actives of the end-stopped polyaminamide polymer.

The total actives of the chain terminated polyaminamide polymer can be determined in a number of ways, but we have found quantitative Carbon-13 NMR to be particularly useful. Through a number of NMR experiments we have shown that any chain polyanaminamide polymer known to the art of making PAE resins is comprised of the following structural subunits:

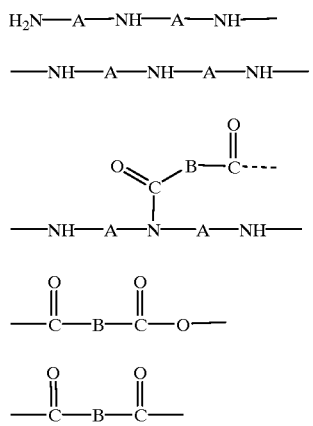

In addition to the above structural features of a typical prepolymer, the polyaminamide polymer of the present invention also contains the following additional structural features:

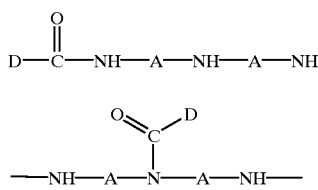

where, D is the monovalent hydrocarbon radical of a given chain terminator having 1 to 9 carbon atoms for an aliphatic chain or 6 to 12 carbon atoms for an aromatic moiety. For example, if the chain terminator is methylcaproate, D would be $(CH_2)_4CH_3$. The relative molar quantity of each structural subunit of the polyaminamide of typical PAE resins known to the art, as well as polyaminamide polymers applicable to the present invention, is readily determined by quantitative Carbon-13 NMR; where, quantitative C-13 NMR simply means running a conventional 1-dimensional C-13 spectrum at a delay time, between acquisitions, of five times the longest $T_1$ value of the various carbons, and using gated decoupling to suppress the natural nuclear overhauser effect. The total actives of the chain terminated polyaminamide polymer, then, is given by the following equation:

$(3D_{EG}+D+T_{EG})$/total weight of polyaminamide polymer solids where, $D_{EG}$, D, and $T_{EG}$ are the relative moles of diethylenetriamine endgroups, secondary amines due to in-chain diethylenetriamine units, and end groups bearing a chain terminator, respectively, and the denominator is determined by summing the products of the relative moles of each structural subunit and its formula weight.

The shelf stability of the resultant PAE resin depends on the molecular weight of the PAE resin at quenching with cooling and lowering the pH, and how quickly the molecular weight builds during storage. For the practice of the present invention, a desirable range for the initial molecular weight (i.e., $M_Z$ value at quenching) is from about 300,000 to about 700,000, with a more preferred range being from about 300,000 to about 650,000, and a most preferred range being from about 400,000 to about 550,000 grams per mole. The rate of molecular weight building is independent of the initial PAE molecular weight, but is dependent on the pH at storage. For the present invention, a pH range at storage of from about 2.4 to 4.0 is desirable, with a more preferred range being from about 2.4 to 3.3, and a most preferred range being from about 2.5 to about 2.8.

In the description of the present invention the molecular weight of a given chain terminated polyaminamide polymer or subsequent PAE resin was determined objectively using a GPC column, suitable for cationic polymers, calibrated against linear polyvinylpyridine standards. A typical GPC chromatogram is shown in FIG. 4. From the resultant chromatogram the number average, weight average, peak, and z-average molecular weights, $M_N$, $M_W$, $M_P$, and $M_X$, respectively, are calculated. For the present description of the present invention, the $M_Z$ values will be used to describe the PAE resins, and the $M_W$ values will be used to describe the polyaminamide polymers. In addition, the molecular weight of polyaminamide polymers that are exemplary of prior art can be determined directly from the quantitative Carbon-13 NMR data described above. The NMR molecular weight values in these cases correlate well with the GPC data.

The various polymer molecular weight averages are calculated from a GPC chromatogram (FIG. 4) and the corresponding calibration curve for the polymer standards (i.e., polyvinylpyridine) according to the following equation:

$$M_X = \Sigma[H_i]M_i^n / \Sigma[H_i]M_i^{n-1}$$

where H is the concentration (mass/volume) of polymers having M, molecular weight in the area of retention values for a slice, i, of the GPC trace, and $M_X$ is equal to $M_N$, $M_W$, and $M_Z$ when n is equal to 1, 2, or 3 respectively. Typically about 100 slices (i.e., i=100) of the GPC trace are taken. The molecular weight at each slice is obtained from the calibration curve of molecular weights of known polymer standards versus retention time. The concentration at each slice is proportional to the integrated area of the slice.

The azetidinium content (charge) of a given PAE resin can be determined accurately by polymer titration or by quantitative Carbon-13 NMR analysis of the PAE resin. We have found, through various NMR experiments, that commercial PAE resins are comprised of the following structural sub-units:

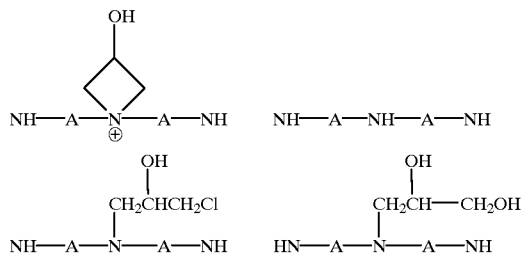

-continued

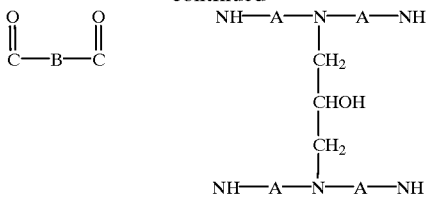

The relative moles (r-moles) of each of these subunits is easily determined by quantitative Carbon-13 NMR analysis (see above). The azetidinium content, expressed as milliequivalents/gram solids, is determined by the following equation:

(r-moles azetidinium groups/weight of solids)×1000 where the denominator is the sum of the products of the relative moles of each subunit and its formula weight plus the sum of the products of the relative moles of each residual (non-polymer) chlorinated organic species and its molecular weight. As can be seen in the following Table 1 the PAE azetidinium content by NMR agrees very well with the value obtained by polymer charge titration of the PAE resin at pH 8.0 with polyvinylsulfonate (PVSK):

TABLE 1

| Commercial PAE Resins | Charge by NMR | Charge by Titration |
|---|---|---|
| A | 2.15 | 2.19 |
| B | 1.79 | 1.87 |
| C | 1.91 | 1.93 |
| D | 1.79 | 1.78 |
| E | 2.23 | 2.11 |
| F | 1.35 | 1.35 |
| G | 1.29 | 1.25 |
| H | 2.18 | 2.18 |
| I | 1.57 | 1.76 |
| J | 0.74 | 0.99 |
| K | 2.02 | 1.95 |
| L | 1.84 | 1.75 |

In addition to the structural subunits described above for PAE resins, the reaction between chain terminated polyaminamide polymer and an epihalohydrin also produces some residual (non-polymer) chlorinated organics. When epichlorohydrin is used, these products include 1,3-dichloro-2-propanol, 3chloro-1, 2-propane diol, and 1,2-dichloro-3-propanol. In the present description of the present invention the total level of these residual chlorinated organics is expressed as a weight percent (wt %) of the total solids of the PAE resin solution by the following equation:

$(\Sigma M_{AOX} MW_{AOX}/\text{wt of solids}) \times 100\%$ where $M_{AOX}$ is the relative moles, as obtained from quantitative C-13 NMR, of a given residual (non-polymer) chlorinated organic compound and $MW_{AOX}$ is its corresponding molecular weight, and "wt. of solids" is the sum of the products of the relative moles, as obtained from quantitative C-13 NMR, of each PAE structural subunit and its molecular weight plus the sum of the products of the relative moles of each residual (non-polymer) chlorinated organic compound and its molecular weight. As shown in the following Table 2 total wt % residual (non-polymer) chlorinated organics (AOX) by quantitative C-13 NMR agrees excellently with the same values obtained by gas chromatography (GC):

TABLE 2

| Commercial PAE Resin | Total AOX by NMR | Total AOX by GC |
|---|---|---|
| A | 9.71 | 9.36 |
| B | 9.39 | 9.44 |
| C | 13.43 | 13.18 |

The shelf stability of a PAE resin of the present invention is determined by allowing the PAE resin to stand in a closed container at a given temperature and the molecular weight of the PAE, as determined by GPC, is evaluated periodically over a period of time. During a given GPC analysis a 0.5% solution of a given PAE is first filtered through a $0.45\mu$ filter. If the filter plugs after filtering 34 mL of the PAE solution then the age of the PAE resin at that point constitutes the early limit of the PAE shelf life. The final limit of the PAE shelf life is age when the PAE resin jells or becomes intractably viscous (i.e., filter clogs after $\leq 2$ mL dilute PAE solution).

A PAE resin of the present invention is high solids when it has a final solids greater than about 35 wt %, or most preferably greater than about 38 wt %.

Our polyaminamide polymer is capable of further reaction with epichlorohydrin to form a polyaminamide-epichlorohydrin resin exhibiting a Z average molecular weight of about 300,000 grams per mole to 700,000 grams per mole and an azetidinium moiety content in excess of 1.4 milliequivalents per grams of solids wherein the Z average molecular weight is controlled by the addition of the following chain and branch terminators to the polyaminamide polymer:

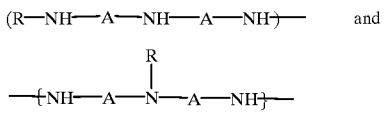   and

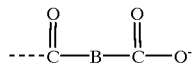

and mixtures of these wherein A is a divalent hydrocarbon radical and R is a monovalent hydrocarbon radical. The polyaminamide comprises in addition to the chain terminating moiety herein disclosed the following polymer end group:

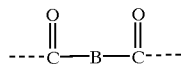

The following polyamine moieties

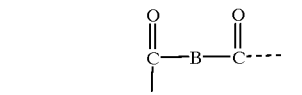

are randomly distributed in an alternating manner with

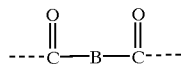

throughout the polyaminamide and wherein A and B are divalent aliphatic radicals having 1 to 9 and 0 to 9 carbon atoms, respectively, or divalent aromatic radicals having 6 to 12 carbon atoms, or mixtures of these.

Our process for the manufacture of chain terminated polyaminamide polymers suitable for use in the preparation of polyamide-epichlorohydrin resins comprises reacting an aliphatic diacid or diester having a carbon chain length of about 2 to 9 carbon atoms with a monovalent chain terminator and a polyalkylenepolyamine or polyarylenepolyamine having alkylene chain lengths of 2 to 9 carbon atoms for aliphatic hydrocarbons and 6 to 12 carbon atoms for aromatic hydrocarbons wherein the reaction is conducted at a temperature of about 90° C. to 200° C. provided that the amount of chain terminator added falls in the range of about 5 to 15 mole percent of the total molar content of carboxylic acid or ester groups in the mixture.

In this process, when an aliphatic diester is used the chain terminator is selected from the group of linear or branched monoesters of the general structure

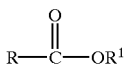

Where R is either hydrogen, or equal to, or different than R' and either are of carbon chain lengths of about 1 to about 9. However, when in this process an aliphatic diacid is used the chain terminator is selected from the group of linear or branched monoacids of the general structure

where R is hydrogen or has a carbon chain length of about 1 to 9.

We have discovered an acidic aqueous formulation of a fully functional wet strength agent formulation suitable for use in the manufacture of absorbent paper products characterized in that the wet strength agent formulation has a solids content of about 12 to 45 percent comprising polyaminamide-epichlorohydrin resin having a Z average molecular weight ($M_Z$) in excess of 300,000 grams per mole, an azetidinium moiety content in excess of about 1.4 milliequivalents per gram of solids and a low weight percent of residual chlorinated organic compounds, wherein the wet strength agent formulation does not jell at 25° C. to 38° C. in less than four weeks after formulation of the thermosettable wet strength resin formulation and the polyaminamide-epichlorohydrin resin is made with a mole ratio of epichlorohydrin to polyaminamide of about 0.9:1 to 1.3:1 where the polyaminamide is made from an aliphatic diacid or diester, a polyalkylene polyamine, and a chain terminator. Our novel thermosettable wet strength resin comprises the reaction product epihalohydrin and a nitrogen chain capped polyaminamide wherein the wet strength agent is a polyaminamide-epichlorohydrin resin having a Z average molecular weight ($M_Z$) in excess of 300,000 grams per mole, an azetidinium moiety content in excess of 1.4 milliequivalents per gram of solids, wherein the resin formulation has less than seven weight percent, based on the solids, of organic chloride residue and wherein the thermosettable aqueous wet strength agent formulation at a 12 to 45 weight percent solids content does not jell in less than four weeks after formulation at a temperature of about 25° to 38° C.

Our invention also includes a process for the manufacture of chain terminated polyaminamide polymers suitable for use in the preparation of thermosettable wet strength polyaminamide-epichlorohydrin resins comprising reacting an aliphatic diacid or diester having a carbon chain length of about 2 to 9 carbon atoms and a chain terminator with a polyalkylenepolyamine or polyarylenepolyamine wherein the reaction is conducted at a temperature of about 90° C. to 200° and the amount of chain terminator added falls in the range of about 5 to 15 mole percent of the total molar content of carboxylic acid or ester groups in the mixture.

We have discovered a non-base activated aqueous thermosettable polyamide-epichlorohydrin resin formulation. This resin formulation at doses of resin dry solids of at least 0.05 weight percent imparts commercially acceptable permanent wet strength to paper and paperboard products.

These thermosettable wet strength resins are suitable for use in the manufacture of paper products and absorbent paper products. The cellulose paperboard webs comprise:
(a) predominantly cellulose fibers and
(b) thermosettable wet strength resins of this invention.

The thermosettable wet strength resins are particularly suited for the manufacture of absorbent paper products such as single or multi-ply towel facial tissue, napkins and bathroom tissue. The paperboard web can similarly be converted in paper bags, dairy carton stock, boxboard and related applications.

Suitably the absorbent paper is manufactured utilizing
(a) Softwood fiber, hardwood fiber, recycle fiber, refined fiber or a mixture of these in an amount sufficient to form an overall furnish of from approximately 1 to 100% hardwood fiber, softwood fiber, recycle fiber, refined fiber or a mixture of these;
(b) adding a predetermined quantity of the thermosettable strength-enhancing resin of this invention;
(c) forming a paper product by drying on one or more drying means to a moisture content of less than ten percent.

Wherein the paper product has an initial normalized CD tensile strength of greater than 75 grams/3 inches. Our invention includes methods for forming paper products adapted for use in a dry condition and for use in a manually moistened condition comprising forming a furnish including at least one of softwood fiber, hardwood fiber, refined fiber or a mixture of these and the wet strength resin of this invention.

Our resins are also suitable for use in the manufacture of absorbent paper products prepared by the through drying (TAD) process. In this process an absorbent paper product comprising a cellulosic web adapted for use in a dry or wet condition said paper product comprising the thermosettable wet strength resin of this invention. The amount of the wet strength resin added being sufficient to produce an initial normalized CD wet dry strength of at least about 75 g/3 inch strip. These products can be in the form of a single or multiply towel, facial tissue or bathroom tissue.

The thermosettable wet strength resin of this invention is the reaction product of a polyaminamide prepared by condensation polymerization of an organic diacid or diester and a polyalkylenepolyamine in the presence of a condensation polymer chain terminator. Suitable chain terminators have been disclosed herein above but any condensation polymer chain terminator is suitable. The thermosettable wet strength resin of this invention is the reaction of the polyaminamide described above and an epihalohydrin, usually epichlorohydrin in water at a mole ratio of the epihalohydrin to the polyaminamide of 0.5:1 to 1.3:1 wherein the pH of the aqueous resin formulation is about 2.4 to 4.0 preferably 2.5 to 2.8. The thermosettable wet strength resin formulation has a solid content of at least about 35 weight percent, suitably 35 to 45 weight percent. In some applications, the solid content can be diluted to 12 weight percent. Thus with the use of dilution, the wet strength resin formulation can have a solid content of about 12 to 45 weight percent. The polyaminamide-epichlorohydrin resin has an initial Z molecular weight ($M_Z$) in excess of 300,000 grams per mole, suitably 400,000 to 550,000, preferably 500,000 to 550,000 grams per mole. The azetidinium moiety content is kept in excess of about 1.4 milliequivalents per gram of solid. Suitably 1.5 to 1.7 or higher. The thermosettable aqueous wet strength formulation does not jell in less than four weeks at the usual temperatures encountered in the transportation and use of the resin. Thus the resin does not jell at temperature of about 25 to 38° C. in less than four weeks.

The following examples are illustrative of the present invention. It should be understood that the examples are not intended to limit the invention and that various changes may be made by those skilled in the art without changing the essential characteristics and the basic concept of the invention.

EXAMPLE 1

This example serves to demonstrate how a polyaminamide polymer applicable to the present invention is typically made using esters. A non-pressurized reactor was charged with 50.00 g dimethyladipate, 8.30 g methylcaproate, 33.06 g diethylenetriamine, and heated with stirring under a nitrogen atmosphere to about 150° C., whereupon the methanol began to reflux, and stirring and heating was continued for 6 hours, whereupon the temperature had dropped to about 95° C. and a quantity of methanol was distilled off to raise the temperature to about 155° C., stirring was then continued for 1.5 hrs., whereupon the remaining methanol and other volatiles were distilled off by heating and sparging with nitrogen, the heat was removed, and after the temperature had dropped to about 140° C. the resultant viscous yellow fluid was diluted with 100 mL deionized water to provide the clear yellow polyaminamide polymer, 7048P (Table 4).

Replicates of the polyaminamide polymer, 7048P, are also described in Table 4 to demonstrate the constancy of the preparation.

EXAMPLE 2

This example demonstrates the effect of increasing the amount of chain terminator used when preparing polyaminamide polymers of the present invention. Example 1 was repeated except 50.00 g dimethyladipate, 13.19 g methylcaproate, and 35.01 g diethylenetriamine were used. As shown in Table 4, the resultant polyaminamide polymer, 7049P, has a lower molecular weight and has lower actives than those described in Example 1.

EXAMPLE 3

This example describes the use of a lower boiling chain terminator when preparing a polyaminamide polymer of the present invention. Example 1 was repeated except 7.40 g ethylbutyrate was used instead of the methylcaproate. As can be seen in Table 4, the resultant polyaminamide polymer, 7047P, has a higher molecular weight and higher actives than those described in Example 1. These properties are obtained because less chain terminators are incorporated in the polyaminamide polymer of this example than in Example 1.

EXAMPLE 4

This example describes the use of an aromatic ester chain terminator. Example 1 was repeated except 8.67 g methylbenzoate was used instead of methylcaproate. As can be seen in Table 4, the resultant polyaminamide polymers 7039 and 7042P, have higher molecular weights and lower actives than those described in Example 1. Apparently, the methylbenzoate preferentially reacts with the secondary amine groups of the diethylenetriamine; as evidenced by the increased number of $T_T$ subunits in these polyaminamide polymers compared to those of Example 1.

EXAMPLE 5

This example describes the effect of lowering the amount of chain terminator used when preparing polyaminamide polymers of the present invention. Example 1 was repeated except 50.00 g dimethyladipate, 4.11 g methylbenzoate, and 31.33 g diethylenetriamine were used. As can be seen in Table 4, the resultant polyaminamide polymer, 7038P, has a higher molecular weight and has lower actives than those described in Examples 1 and 4.

EXAMPLE 6

This example serves to demonstrate how a polyaminamide polymer applicable to the present invention is typically made using acids. Using this method it was unexpectedly found that polyaminamide polymer having a faint color were obtained. It is helpful to the papermaking operation that additives are more or less colorless since otherwise the whiteness of the resulting absorbent paper products is affected. A non-pressurized reactor was charged with 40.00 g adipic acid, 7.06 g hexanoic acid, stirred under a nitrogen atmosphere, and, after 10 min., 31.53 g of diethylenetriamine was added dropwise via a cannula transfer needle, heating was applied, and when the temperature reached about 160° C. 10 ml deionized water was added via cannula transfer needle, temperature was then maintained at about 135° C. for 3 hrs, whereupon water was distilled off over a 1.5 hr period raising the temperature to about 180° C., and the temperature was maintained between 180 and 195° C. for 2 hrs by periodically distilling off additional water, whereupon the remaining water and other volatiles were removed by heating and sparging with nitrogen, heating was removed and after the temperature had dropped to about 140° C. the resultant viscous yellow fluid was diluted with 100 ml deionized water to provide the clear and very faint yellow polyaminamide polymer, 7051P (See Table 4).

EXAMPLE 7

This example serves to demonstrate how a polyaminamide polymer, either from ester or acids, of the present invention is treated with epichlorohydrin to provide the desired high solids PAE resin of the present invention. A flask was charged with 23.3340 g of 7048P prepared as shown in Example 1, 7.9834 g deionized water, 5.1245 g epichlorohydrin, stirred at about 60° C. for 2 hrs and quenched, with cooling, with conc. HCl to a final pH of 3.0 to provide the PAE resin, 7048B at 39.90 wt % solids.

Other PAE resins prepared in a similar fashion with other polyaminamide polymers of the present invention are described in Table 4. As molecular weight of the polyaminamide polymer of the present invention increases (Examples 3–5), a greater excess of epichlorohydrin must be employed to yield a useful PAE of the present invention. As molecular weight of the polyaminamide polymers of the present invention decreases (Example 2), less epichlorohydrin can be used to prepare the high solids PAE resin; however, azetidinium content is also lowered (Table 4).

It is readily seen that high solids PAE resins of the present invention have shelf lives greater than about 3 weeks at rt (room temperature). Furthermore, it was found that the shelf life depends both on the initial molecular weight of the PAE resin and the rate at which molecular weight builds. Thus, for example, if the initial molecular weight is too high (i.e., pre-jelling point) the shelf life will be short. The shelf life will also decrease as the rate of molecular weight building increases.

Figure 1:
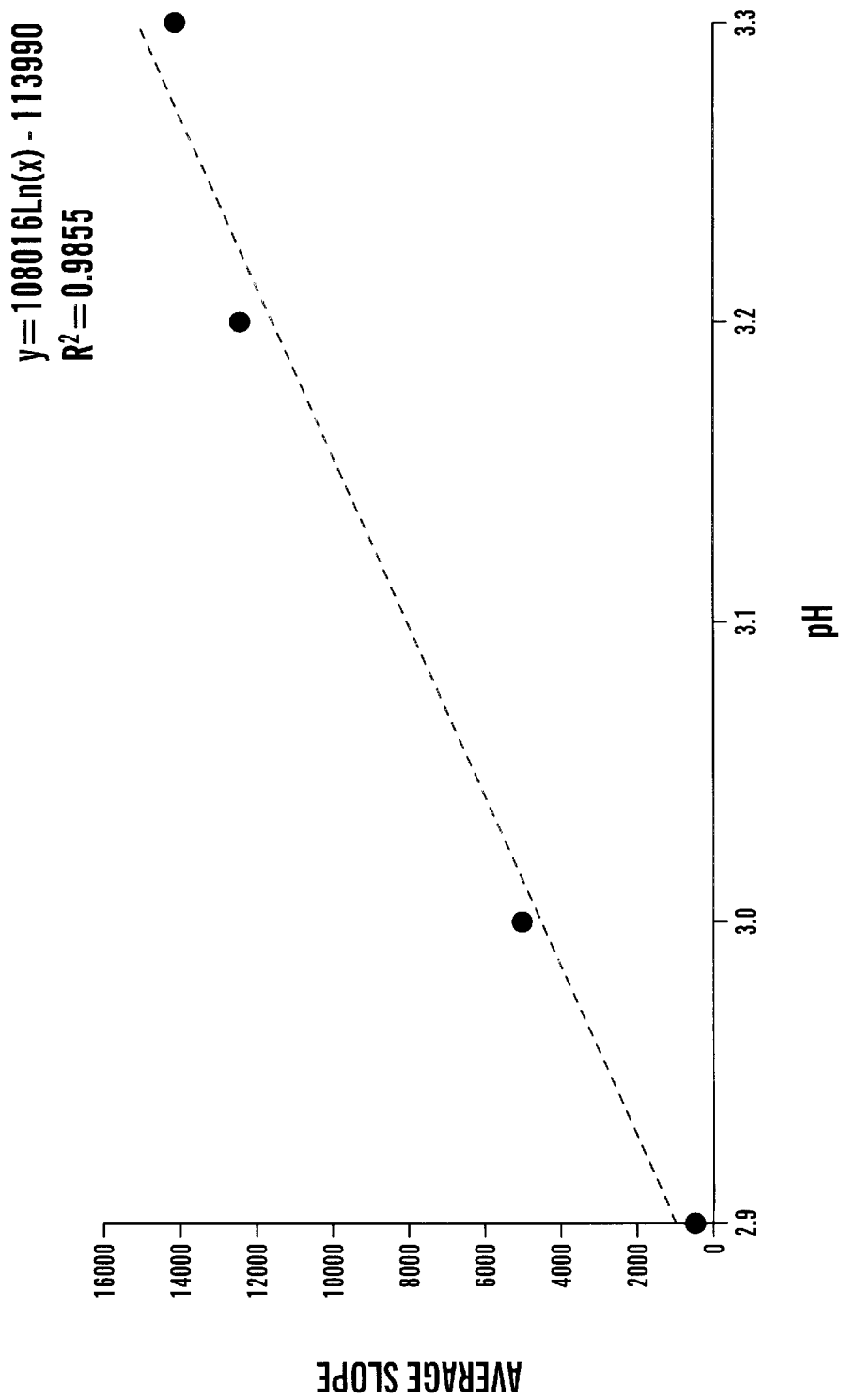
FIG. 1 is a graph plotting the average aging slope for high solids PAE resins of this invention prepared from polyaminamide polymers of the present invention based on 10 mol percent methylcaproate or hexanoic acid versus pH at storage.

The rate of molecular weight building is independent of the initial PAE resin molecular weight, but quite dependent on the pH at storage. The latter dependency is clearly seen in FIG. 1. Thus, high solids PAE resins of the present invention, falling within the preferred initial molecular weight range, when stored at a pH of about 3.0 will have shelf lives exceeding 4 weeks.

Figure 2:
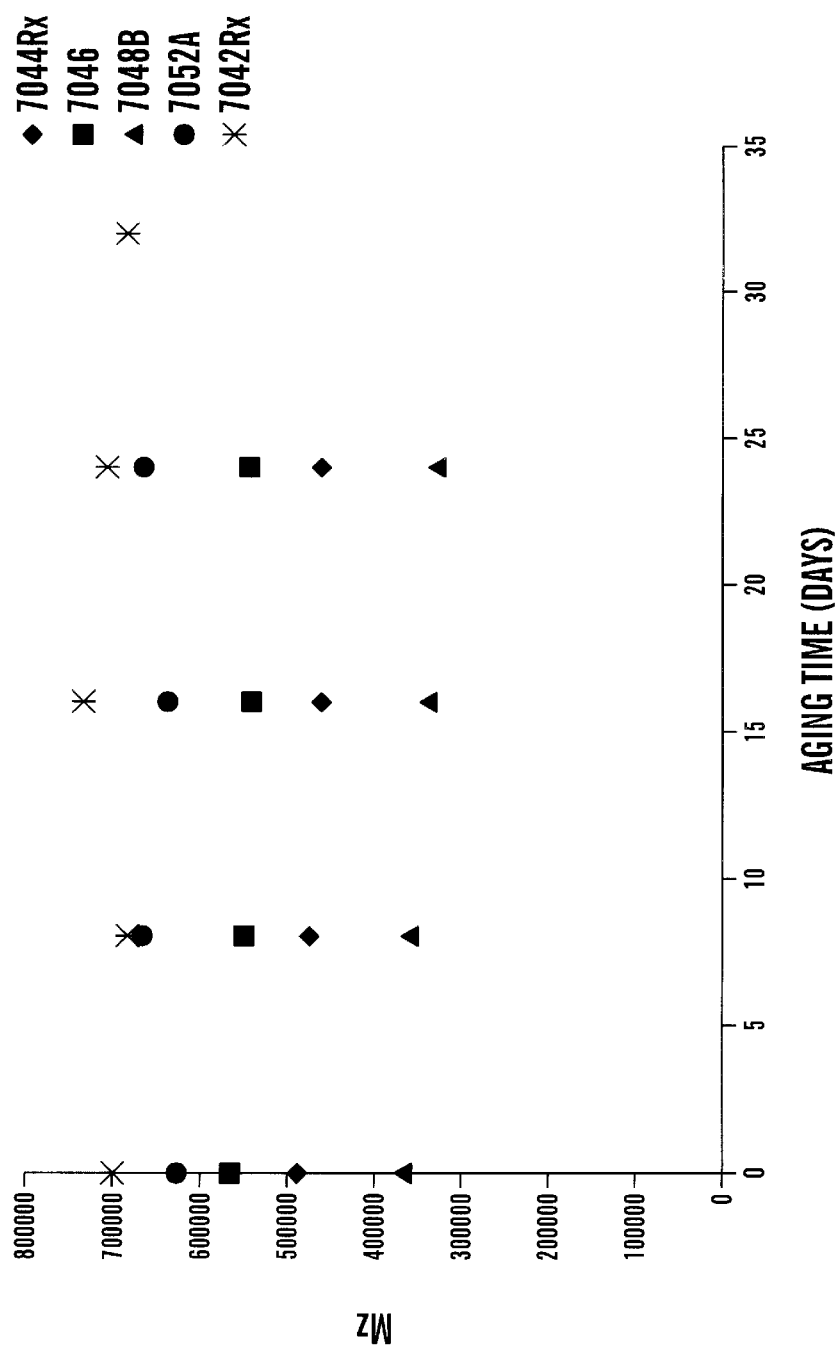
FIG. 2 is a graph plotting the molecular weight versus aging time at room temperature for various high solids PAE resins formulations of the present invention that were first aged for seven days and then diluted to 12 weight percent solids.

PAE resins of the present invention have more than enough shelf stability to allow time for delivery to a mill site. It is anticipated, although not to be considered limiting, to practice the present invention by delivering the high solids PAE of the present invention to the mill site and diluting it. Once diluted, the PAE resins of the present invention will age as do other commercial low solids PAE resins. As shown in FIG. 2, various PAE resins of the present invention, after aging at high solids for 7 days, and then diluted to 12 wt % solids, show no molecular weight building even after more than 3 weeks of additional aging at room temperature.

EXAMPLE 8

Figure 3:
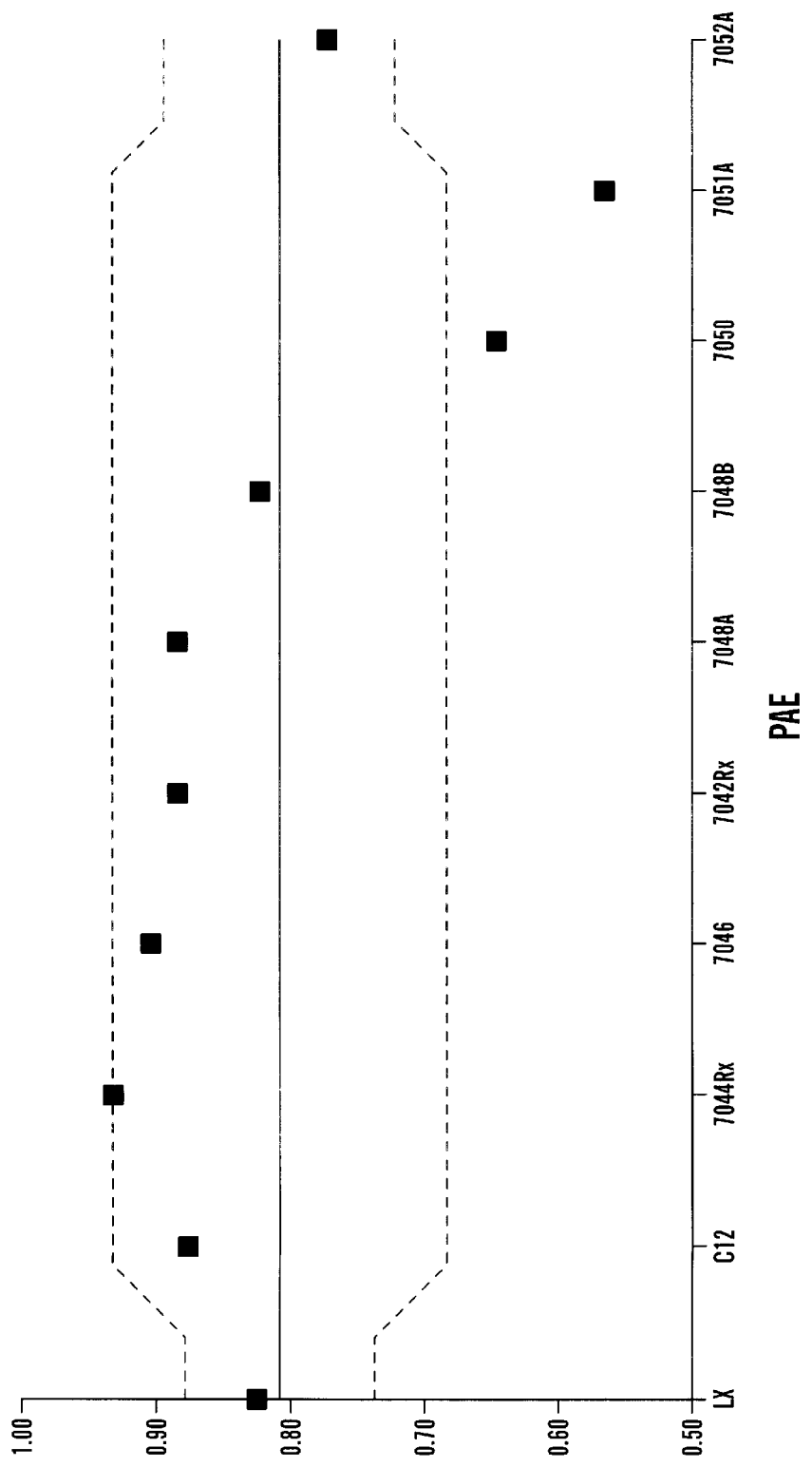
FIG. 3 is a graph demonstrating the wet breaking strength of handsheets prepared with twelve pounds of the PAE resin of this invention per ton of the cellulosic handsheet. The dotted line represents the 95% confidence limits.

This example demonstrates that the various high solids PAE resins of the present invention are fully functional. Handsheets were made using an automated handsheet former to a target basis weight of about 32 g/m² in the following manner: a 1.0% solution of a given PAE was added to a stirring 3.0% slurry of a 1:1 mixture of unrefined bleached Northern Softwood and Hardwood pulps, so that the add-on of PAE resin was 12 pounds per ton (based on dried fiber weight), the resultant stock was diluted and adjusted to a pH of about 7.5 and handsheets were formed. The resultant handsheets were cured in a forced air oven @ 105° C. for 6 min., and then conditioned in a Tappi room for 24 hrs. The wet and dry tensiles were determined using an Instron Tensile Tester. The wet tensile was evaluated by dipping a 3" loop of paper in water, blotting, and then pulling a tensile. As can be seen in the plot in FIG. 3 the PAE resins of the present invention performed equivalently or better than the commercial low solids PAE resins (i.e., KYMENE® 557LX and CASCAMID® C-12) at the 95% confidence level (dotted lines). The performances of PAE resins, 7050 and 7051A, illustrate the important dependency of wet strength development on the molecular weight and azetidinium content of the PAE resin.

While the high solids PAE resins of the present invention perform equivalently or better than commercial PAE resins, they also contain significantly less total residual (non-polymer) chlorinated organics (Table 3):

TABLE 3

| PAE Resin** | Solids (wt %) | Total AOX (wt % of solids) |
|---|---|---|
| KYMENE ® 557H | 13.2 | 10.1 |
| CASCAMID ® C12 | 12.4 | 9.71 |
| AMRES ® HS-30 | 31.1 | 16.6 |
| FIBRABON ® 36 | 23.7 | 12.0 |
| 7052A | 39.8 | 4.75 |
| 7048B | 39.9 | 4.83 |
| 7042Rx | 39.8 | 5.95 |
| 7044A | 40.0 | 4.37 |

TABLE 3-continued

| PAE Resin** | Solids (wt %) | Total AOX (wt % of solids) |
|---|---|---|
| 7044Rx | 39.7 | 4.46 |
| 7046 | 39.9 | 4.96 |

**The wet strength from 12#/T add-on of these PAE resins is equivalent to that with 557LX (@ 95% confidence limits) except for HS-30, which is lower.

EXAMPLE 9

This example demonstrates what happens if the molecular weight of the polyaminamide polymer is reduced by simply shortening its synthesis time, instead of using chain terminators. A reactor was charged with 50.00 g dimethyladipate, 29.91 g diethylenetriamine, and heated with stirring to 150° C., whereupon the methanol began refluxing, and heating was continued for 2 hrs., whereupon the temperature fell to about 99° C., about 9 ml methanol was then distilled off raising the temperature to 110° C., vacuum was applied with heating until no more distillate was noticed, and 90 ml deionized water was added to provide the polyaminamide polymer, 7032. As is readily apparent from Table 4, the PAE prepared from 7032, by treatment with epichlorohydrin (Example 3), had very low molecular weight even after 14 days aging-even though all the conditions favored molecular weight build up. This example as control demonstrates the unexpected and exceptional utility of chain terminators, the basis of the present invention, to achieving fully functional and shelf stable high solids PAE resins.

EXAMPLE 10

This example demonstrates the use of a conventional polyaminamide polymer in preparing a high solids PAE resin. A polyaminamide polymer was prepared exactly as described in Example 1 with 50.00 g dimethyladipate and 29.83 g diethylenetriamine, but no chain terminator. The resultant polyaminamide polymer was, 7024P. As is readily apparent from Table 4, the PAEs prepared from 7024P, by treatment with epichlorohydrin (Example 3), all have shelf lives less than 3 days-even when close to 2 equivalents epichlorohydrin were employed. This example as control demonstrates the unexpected and exceptional utility of chain terminators, the basis of the present invention, to achieving fully functional and shelf stable high solids PAE resins.

EXAMPLE 11

A polyaminamide polymer was prepared using methylbenzoate as described in Example 4 and treated with 1.21 eq. epichlorohydrin, as described in Example 7, to yield a thermosettable polyaminamide epichlorohydrin (PAE) resin product having a solids content of 40.2%, a charge density of 1.80 meq/q, $M_z$=521500, AOX=6.53 wt % of solids, and an initial pH of 2.8. After 1 week at room temperature, the pH was adjusted to 2.5 with anhydrous sulfuric acid and the resulting resin formulation was stable for an additional 4 weeks at 38° C. The formulation at an initial pH 2.8, diluted to 25% solids was stable for >9 weeks at 38° C. The formulation at an initial pH 2.8, at 40.2% solids, was stable for >9 weeks at 25° C. The polyaminamide-epichlorohydrin resin product provided equal wet strength as attained with a commercial PAE resin at equal add-on.

EXAMPLE 12

A polyaminamide polymer was prepared using butylacetate instead of methylcaproate, as described in Example 1, and treated with 1.10 eq. epichlorohydrin, as described in Example 7, to yield a thermosettable polyaminamide-epichlorohydrin (PAE) resin product having a solids content of 39.9%, a charge density of 1.72 meq/g. $M_Z$=578400, total AOX=3.01 wt % of solids, and an initial pH of 2.8. After 1 week at room temperature, the pH was adjusted to 2.5 with anhydrous sulfuric acid and the resulting resin formulation was stable for more than an additional 4 weeks at 38° C. As with previous examples, this product at 39.9% solids, or diluted to 25% solids is stable "indefinitely" at 25° C., or 38° C., respectively

TABLE 4

| Entry | Chain Terminator | C.T. mol %[A] | PAA | PAA $M_w$[B] | Total Branches (mol % DETA) | Percent of C.T. as branch | PAA Actives (eq/g) | PAA solids (%) | ECH[C] equiv. | Rx Solids[D] (%) | Rx time (min.) |
|---|---|---|---|---|---|---|---|---|---|---|---|
| 1 | None | 0 | 7024P | 4640 | 6.6 | | 0.0052 | 37.93 | 1.8 | 53.3 | 108 |
| 2 | | | | (4646)[G] | | | | | 1.3 | 50.2 | 100 |
| 3 | | | | | | | | | 0.90 | 46.7 | 35 |
| 4 | None | 0 | 7032 | 2400[G] | 5.9 | | 0.0064 | 39.70 | 1.10 | 52.1 | 110 |
| 5 | MC[H] | 10(7.3)[I] | 7036P | 2104 | 14.5 | 11.2 | 0.0052 | 42.52 | 1.15 | 40.0 | 120 |
| 6 | MB[H] | 5(4.4)[I] | 7038P | 3134 | 23.2 | 61.7 | 0.0045 | 42.12 | 1.39 | 40.0 | 120 |
| 7 | | 10(9.8)[I] | 7039P | 2509 | 26.0 | 58.8 | 0.0048 | 43.38 | 1.32 | 40.0 | 140 |
| 8 | | 10(9.7)[I] | 7042P | 2266 | 24.8 | 54.3 | 0.0049 | 41.93 | 1.17 | 40.0 | 120 |
| 9 | MC[H] | 10(7.7[K])[I] | 7044P | 2083 | 16.6 | 10.2 | 0.0052 | 42.94 | 1.02 | 40.0 | 90 |
| 10 | | | | | | | | | 1.06 | 40.0 | 113 |
| 11 | | | | | | | | | 1.09 | 40.0 | 120 |
| 12 | | | | | | | | | 1.12 | 40.0 | 120 |
| 13 | EB[H] | 10(3.7)[I] | 7047P | 2307 | 15.5 | 17.9 | 0.0056 | 41.64 | 1.09 | 40.0 | 85 |
| 14 | | | | | | | | | 1.20 | 40.0 | 105 |
| 15 | | | | | | | | | 1.25 | 40.0 | 115 |
| 16 | MC[H] | 10(8.0)[I] | 7048P | 2110 | 15.4 | 8.2 | 0.0051 | 40.46 | 1.10 | 40.0 | 120 |
| 17 | | | | | | | | | 1.15 | 40.0 | 120 |
| 18 | MC[H] | 15(13)[I] | 7049P | 1681 | 19.6 | 13.4 | 0.0049 | 41.71 | 1.10 | 40.0 | 120 |
| 19 | | | | | | | | | 1.00 | 40.0 | 120 |
| 20 | | | | | | | | | 1.10 | 40.0 | 120 |
| 21 | | | | | | | | | 1.00 | 40.0 | 120 |
| 22[L] | HA[H] | 10(10)[I] | 7051P | 2140 | 15.0 | 9.7 | 0.0053 | 39.32 | 1.10 | 40.0 | 120 |
| 23[L] | | | | | | | | | 1.15 | 39.9 | 120 |
| 24[L] | | | | | | | | | 1.06 | 40.0 | 120 |
| 25[L] | | | | | | | | | 1.00 | 40.0 | 115 |

| Entry | PAE | Final Solids[E] (%) | pH | PAE charge (meq/g) | PAE age @ rt (days) | PAE $M_Z$[B] | Shelf Life @ rt (weeks)[F] |
|---|---|---|---|---|---|---|---|
| 1 | 7026 | nd | 3.0 | 1.44 | | nd | <0.5 |
| 2 | 7026B | nd | 3.5 | 1.4 | | nd | <0.5 |
| 3 | 7028 | nd | 3.0 | 0.68 | | nd | <0.5 |
| 4 | 7032$R_x$ | nd | 4.0 | 1.45 | 14 | 43K | >4 |
| 5 | 7036$R_x$ | 39.90 | 3.2 | 1.59 | 0 | 205K | >4 |
| 6 | jelled | | | | | | |
| 7 | 7039$R_x$ | 39.10 | 3.1 | 1.61 | 0 | 91K | >4 |
| 8 | 7042$R_x$ | 39.82 | 3.0 | 1.54 | 0 | 700K | 1 |
| 9 | jelled | | | | | | |
| 10 | jelled | | | | | | |
| 11 | 7044$R_x$ | 39.66 | 3.0 | 1.51 | 0 | 434K | >4 |
| 12 | 7046 | 39.94 | 3.3 | 1.50 | 0 | 457K | 3–4 |
| 13 | jelled | | | | | | |
| 14 | jelled | | | | | | |
| 15 | jelled | | | | | | |
| 16 | 7048A | 40.00 | 2.9 | 1.45 | 0 | 664K | 3–4 |
| 17 | 7048B | 39.90 | 3.0 | 1.45 | 0 | 356K | >4 |
| 18 | 7049A | 39.90 | 2.9 | 1.38 | 0 | 47K | >4 |
| 19 | 7049B | 40.16 | 3.1 | 1.41 | 0 | 629K | 2–3 |
| 20 | 7049C | 39.67 | 3.1 | 1.40 | 0 | 75K | >4 |
| 21 | 7050 | 39.96 | 3.1 | 1.36 | 0 | 582K | 4 |
| 22[L] | 7051A | 39.72 | 3.0 | 1.51 | 0 | 135K | >4 |
| 23[L] | 7051B | 39.39 | 3.0 | 1.49 | 0 | 68K | >4 |
| 24[L] | 7052A | 39.83 | 3.2 | 1.50 | 0 | 594K | 2–3 |
| 25[L] | jelled | | | | | | |

[A]Based on total moles of carbonyl groups
[B]By GPC unless otherwise stated
[C]Epichlorohydrin
[D]Based on the weights of all materials in the reaction mixture
[E]Determined gravimetrically
[F]The first number is when some difficulty in filtering is noticed and the last number is when the product jelled.
[G]By C13 NMR
[H]MC = methyl caproate; MB = methyl benzoate; EB = ethyl butyrate; HA = hexanoic acid

[Footnotes to Table 4:]

[I] Actual amount incorporated into polymer (by NMR)
[J] The resin had aged 13 days @ rt when evaluated in handsheets (see F)
[K] Standard Deviation = +/−0.7
[L] Prepolymer synthesized with adipic acid instead of the dimethyladipate

We claim:

1. A thermosettable wet strength resin comprising the product of reaction of an epihalohydrin and an end-capped polyaminamide polymer.

2. The wet strength resin of claim 1 wherein the epihalohydrin is epichlorohydrin.

3. An end-capped polyaminamide polymer reacted with epichlorohydrin to form a thermosettable polyaminamide-epichlorohydrin resin exhibiting a Z average molecular weight of about 300,000 grams per mole to 700,000 grams per mole and an azetidinium moiety content in excess of about 1.4 milliequivalents per gram of solids wherein the Z average molecular weight is controlled by the addition of the following chain and branch terminators to the polyaminamide polymer:

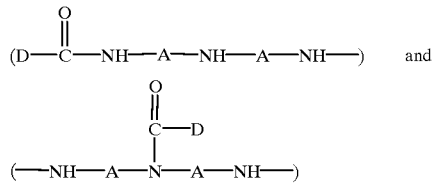  and and mixtures of these wherein A is a divalent hydrocarbon radical and D is a monovalent hydrocarbon radical.

4. The polyaminamide polymer of claim 3 wherein D is a monovalent aliphatic hydrocarbon radical having 1 to 9 carbon atoms or a monovalent aromatic hydrocarbon radical having 6 to 12 carbon atoms, or a mixture of these.

5. The polyaminamide polymer of claim 3 wherein D is selected from the group consisting of: phenyl, naphthyl, methyl, ethyl, propyl, butyl, pentyl, hexyl, heptyl, octyl, and nonyl.

6. The polyaminamide polymer of claim 3 wherein A is selected from the group consisting of: phenylene, naphthylene, methylene, ethylene, propylene, butylene, pentylene, hexylene, heptylene, octylene, and nonylene.

7. An end-capped polyaminamide polymer reacted with epichlorohydrin to form a thermosettable polyaminamide-epichlorohydrin resin exhibiting a Z average molecular weight of about 300,000 grams per mole to 700,000 grams per mole and an azetidinium moiety content in excess of 1.4 milliequivalents per grams of solids wherein the Z average molecular weight is controlled by the addition of the following chain and branch terminators to the polyaminamide polymer:

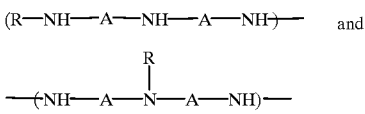  and and mixtures of these wherein A is a divalent hydrocarbon radical and R is a monovalent hydrocarbon radical.

8. The polyaminamide polymer of claim 7 wherein R is a monovalent aliphatic hydrocarbon radical having 1 to 9 carbon atoms or a monovalent aromatic hydrocarbon radical having 6 to 12 carbon atoms, or a mixture of these.

9. The polyaminamide polymer of claim 7 wherein R is selected from the group consisting of: phenyl, naphthyl, methyl, ethyl, propyl, butyl, pentyl, hexyl, heptyl, octyl, and nonyl.

10. The polyaminamide polymer of claim 7 wherein A is selected from the group consisting of: phenylene, naphthylene, methylene, ethylene, propylene butylene, pentylene, hexylene, heptylene, octylene, and nonylene.

11. An end-capped polyaminamide polymer reacted with epichlorohydrin to form a thermosettable strength enhancing resin web in the manufacture of paper products wherein the polyaminamide polymer has the following molecular structure wherein the polyamine groups and end groups are randomly distributed:

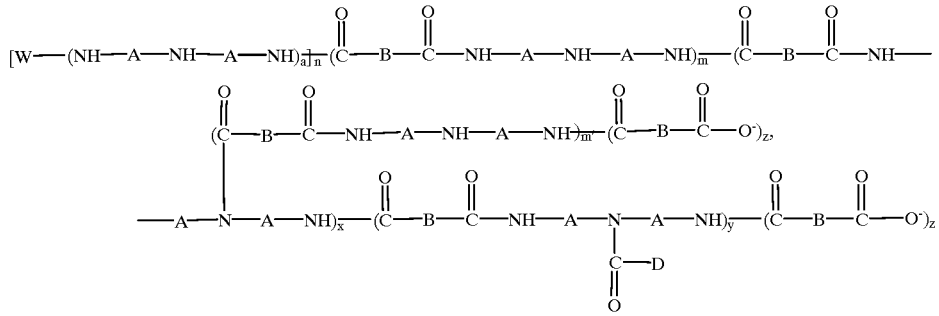

A has a value of 1.0 to 1.9 when W is H; n has a value of 0.5 to 1.5 when W is

m and m' have a combined value of 3 to 11; x has a value of 0 to 20; y has a value of 0 to 1.3; z and z' have a combined value of 0.6 to 3.2; D is a monovalent hydrocarbon radical selected from the group of aliphatic hydrocarbon radicals having 1 to 9 carbon atoms or aromatic hydrocarbon radicals having 6 to 12 carbon atoms and mixtures of these, and A and B are divalent hydrocarbon radicals selected from the group of aliphatic hydrocarbon radicals having 1 to 9 and 0 to 9 carbon radicals, respectively, or aromatic radicals having 6 to 12 carbon atoms and mixtures of these.

12. The polyaminamide polymer of claim 11 wherein D is selected from the group consisting of: phenyl, naphthyl, methyl, ethyl, propyl, butyl, pentyl, hexyl, heptyl, octyl, nonyl, and a mixture of these including their isomers.

13. The polyaminamide polymer of claim 11 wherein A and B are selected from the group consisting of: phenylene, napthylene, methylene, ethylene, propylene, butylene, pentylene, hexylene, heptylene, octylene, nonylene, and a mixture of these including their isomers.

14. The polyaminamide polymer of claim 11 wherein D is an aliphatic radical and a has a value of about 0.9 to 1.1, n has a value of 1.0 to 1.5, m and m' have a combined value of 3 to 10, x has a value of 0 to 1.1, y has a value of 0 to 0.3, and z and z' have a combined value of 0.6 to 1.3.

15. The polyaminamide polymer of claim 11 wherein D is an aromatic radical and a has a value of 1.1 to 1.9, n has a value of 0.5 to 0.8, m and m' have a combined value of 3.0 to 9.0, x has a value of 0 to 2.0, y has a value of 0.7 to 1.3, and z and z' have a combined value of 0.7 to 3.2.

16. An end-capped polyaminamide polymer reacted with epichlorohydrin to form a thermosettable strength enhancing resin for use in the manufacture of paper products wherein the polyaminamide polymer moiety is capped with the amines selected from the group:

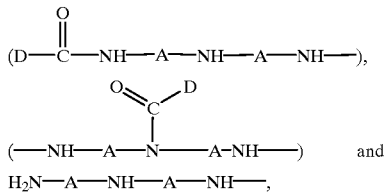

mixtures of these, and the Z average molecular weight of the thermosettable strength enhancing resin is about 300,000 grams per mole to 700,000 grams per mole and the azetidinium moiety content of the strength enhancing resin is at least 1.4 milliequivalents per gram of solid reaction product of the polyaminamide and epichlorohydrin wherein D is a monovalent aliphatic radical having 1 to 9 carbon atoms or a monovalent aromatic radical having 6 to 12 carbon atoms or a mixture of these, and A is a divalent aliphatic radical having 1 to 9 carbon atoms or a divalent aromatic radical having 6 to 12 carbon atoms.

17. The polyaminamide polymer of claim 3 that is end capped with, in addition to the end capping moieties of claims 3, 7 or 16 the polymer end group:

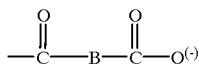

wherein the following organic moieties:

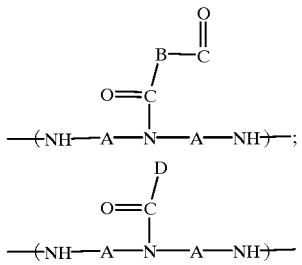

are randomly distributed in an alternating manner with:

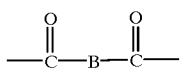

throughout the polyaminamide polymer and wherein A and B are divalent aliphatic radicals having 1 to 9 and 0 to 9 carbon atoms respectively, or divalent aromatic radicals having 6 to 12 carbon atoms, or mixtures of these.

18. A process for the manufacture of a thermosettable wet strength resin comprising adding epihalohydrin to an aqueous mixture of the polyaminamide polymer of claim 3 or claim 7 at a temperature of about 25° C. to about 80° C. wherein the thermosettable wet strength resin is a polyaminamide-epichlorohydrin resin having a Z average molecular weight ($M_Z$) in excess of 300,000 grams per mole, an azetidinium moiety content in excess of 1.4 milliequivalents per gram of solids.

19. A process for the manufacture of a thermosettable wet strength resin comprising adding epihalohydrin to an aqueous mixture of the polyaminamide polymer of claim 11 or claim 16 at a temperature of about 25° C. to about 80° C. wherein the wet strength resin is a polyaminamide-epichlorohydrin resin having a Z average molecular weight ($M_Z$) in excess of 300,000 grams per mole, an azetidinium moiety content in excess of 1.4 milliequivalents per gram of solids.

20. The process of claim 19 wherein the epichlorohydrin addition is conducted at a temperature of about 40° C. to 80° C., the resin formulation has less than seven weight percent based on solids of organic chloride residue and wherein the thermosettable wet strength resin has a Z average molecular weight ($M_Z$) in excess of 300,000 grams per mole, an azetidinium moiety content in excess of 1.4 milliequivalents per gram of solids, and wherein the thermosettable wet strength resin formulation has a solids content of 12 to 45 weight percent and does not gel in less than four weeks after formulation at a temperature of about 25° C. to 38° C.

21. The process of claim 20 wherein the epichlorohydrin addition is conducted at a temperature of about 55° C. to 70° C.

22. The process of claim 19 wherein the epichlorohydrin addition is conducted at temperature of about 40° C. to 80° C., the resin formulation has less than seven weight percent based on solids or organic chloride residue and wherein the thermosettable wet strength has a Z average molecular weight ($M_Z$) in excess of 300,000 grams per mole, an azetidinium moiety content in excess of 1.4 milliequivalents per gram of solids, and wherein the thermosettable wet strength resin formulation has a solids content of 12 to 45 weight percent and does not gel in less than four weeks after formulation at a temperature of about 25° C. to 38° C.

23. A process for the manufacture of chain terminated polyaminamide polymers designed for use in the preparation of thermosettable polyaminamide-epichlorohydrin wet strength resins comprising reacting an aliphatic diacid or diester having a carbon chain length of about 2 to 9 carbon atoms with a monovalent chain terminator and a polyalkylenepolyamine or polyarylenepolyamine having a carbon chain length of 2 to 9 for aliphatic hydrocarbons and 6 to 12 carbon atoms for aromatic hydrocarbons provided that the amount of chain terminator added falls in the range of about 5 to 15 mole percent of the total molar content of carboxylic acid or ester groups in the mixture.

24. The process of claim 23 wherein the quantity of chain terminators added falls in the range of about 7.5 to 12.5 mole percent of the total molar content of carboxylic acid or ester groups present in the reaction mixture of claim 31.

25. The process of claim 23 wherein the quantity of chain terminators added is controlled to be in the range of about 9 to 11 mole percent of the total molar content of carboxylic acid or ester groups in the reaction mixture.

26. The process of claim 23 wherein dimethyladipate and diethylenetriamine are reacted in the presence of methylcaproate.

27. The process of claim 23 wherein the chain terminator is hexanoic acid when an aliphatic diacid is used.

28. The process of claim 23 wherein adipic acid and diethylenetriamine are reacted in the presence of the chain terminator of claim 23.

29. The process of claim 23 wherein the chain terminator is methyl caproate when an aliphatic diester is used.

30. The process of claim 23 wherein the chain terminator is benzoic acid when a diacid is one of the reactants..

31. The process of claim 23 wherein the chain terminator is methyl benzoate when a diester is one of the reactants.

32. The process of claim 23 wherein the chain terminator is selected from the group consisting of primary acyclic linear or branched aliphatic halides or tosylates; primary cyclic aliphatic alkylenyl halides and tosylates; primary arenyl halides and tosylates; monoepoxides; cyclic or acyclic aliphatic or aryl or arenyl isocyanates; cyclic or acyclic aliphatic or aryl or arenyl isothiocyanates; anhydrides; acyl halides; alkynes; and conjugated dienes and cyclic or acyclic alpha beta unsaturated aldehydes and ketones.

33. The process of claim 23 when an aliphatic diester is used the chain terminator is selected from the group of linear or branched monoesters of the general structure

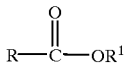

where R is hydrogen or is either equal to, or different than R' and either are of carbon chain lengths of about 1 to about 9.

34. The process of claim 23 wherein the chain terminator is butylacetate when an aliphatic diester is the reactant.

35. The process of claim 23 wherein the reaction is conducted at a temperature of about 90 to 20° C.

36. The process of claim 23 wherein the chain terminator is selected from the group of linear or branched monoacids of the general structure

where R is hydrogen or has a carbon chain length of about 1 to 9 when an aliphatic diacid is used.

37. The process of claim 33 where R is either equal to or different than R' and either are aromatic, or arenyl groups having 6–12 carbons.

38. The process of claim 36 where R is either an aromatic or arenyl group having 6–12 carbons.

39. The process of claim 33, where R is different than R' and they are mixtures of linear or branched aliphatic groups, having carbon chain lengths of 1–6 carbons, and aromatic or arenyl groups having 6–12 carbons.

40. An aqueous formulation of a fully functional thermosettable wet strength resin formulation for use in the manufacture of absorbent paper products wherein the wet strength resin formulation has a solids content of about 12 to 45 weight percent comprising polyaminamide-epichlorohydrin resin having a Z average molecular weight ($M_z$) of about 300,000 grams to 700,000 grams per mole, an azetidinium moiety content in excess of about 1.4 milliequivalents per gram of solids, and the thermosettable polyaminamide-epichlorohydrin resin is made with a mole ratio of epichlorohydrin to polyaminamide polymer of about 0.9:1 to 1.3:1 where the polyaminamide is made from an aliphatic diacid or diester, a polyalkylenepolyamine and a chain terminator.

41. A thermosettable wet strength resin comprising the reaction product of epihalohydrin and an end-capped polyaminamide polymer wherein the thermosettable wet strength resin is a polyaminamide-epichlorohydrin resin having a Z average molecular weight ($M_z$) of about 300,000 to 700,000 grams per mole, an azetidinium moiety content in excess of 1.4 milliequivalents per gram of solids, wherein the resin formulation has less than seven weight percent, based on the solids, of organic chloride residue and wherein the aqueous wet strength resin formulation at a 12 to 45 weight percent solids content does not gel in less than four weeks after formulation at 25° to 38° C.

42. A process for the manufacture of chain terminated polyaminamide polymers designed for use in the preparation of thermosettable polyaminamide-epichlorohydrin resins comprising reacting an aliphatic diacid or diester having a carbon chain length of about 2 to 9 carbon atoms and a chain terminator with a polyalkylenepolyamine or polyarylenepolyamine wherein the reaction is conducted at a temperature of about 90° C. to 200° C. provided that the amount of chain terminator added is in the range of about 5 to 15 mole percent of the total molar content of carboxylic acid or ester groups in the mixture.

43. An aqueous thermosettable polyamide-epichlorohydrin resin formulation that, at dosages of resin dry solids of at least 0.05 weight percent imparts permanent wet strength to paper and paperboard products wherein the resin is the reaction product of a polyaminamide and epihalohydrin wherein the polyaminamide is prepared by condensation polymerization of an organic diacid or diester and a polyalkylene polyamine in the presence of a condensation chain terminator, said polyaminamide being reacted with epihalohydrin in water at a mole ration of the epihalohydrin to the polyaminamide of 0.9:1 to 1.3:1 wherein the pH of the aqueous resin formulation is about 2.4 to 4.0 and the resin formulation has a solids content of about 12–45 weight percent comprising the thermosettable polyaminamide-epichlorohydrin resin having a Z average molecular weight ($M_z$) in excess of 300,000 grams per mole, an azetidinium moiety content in excess of about 1.4 milliequivalents per gram of solids, a total residual non-polymer organochloride content of less than about 7 weight percent of total solids wherein the aqueous wet strength resin formulation does not gel at a temperature of 25 to 38° C. in less than four weeks after formulation of the wet strength resin formulation.

44. The thermosettable wet strength resin formulation of claim 43 wherein the Z average molecular weight of the polyaminamide-epichlorohydrin resin is in the range of about 300,000 to 700,000 grams per mole.

45. The thermosettable wet strength resin formulation of claim 44 wherein the Z average molecular weight of the thermosettable polyaminamide-epichlorohydrin resin is in the range of about 300,000 to 600,000 grams per mole.

46. The thermosettable wet strength resin formulation of claim 45 wherein the Z average molecular weight of the thermosettable polyaminamide-epichlorohydrin resin is about 400,000 to 550,000 grams per mole.

47. The thermosettable wet strength resin formulations of claim 43 wherein the azetidinium moiety content is in excess of about 1.5 milliequivalents per gram of solids.

48. The thermosettable wet strength resin formulation of claim 40 or 43 wherein the thermosettable wet strength resin formulation has a solids content of about 35 to 45 weight percent.

49. The resin formulation of claim 41 wherein the thermosettable wet strength resin formulation has a solids content of about 35 to 45 weight percent.

50. The thermosettable wet strength resin formulation of claim 43 wherein the pH of the formulation is about 2.4 to about 2.8.

51. An absorbent paper product comprising a cellulosic web dewatered by substantially uniform compaction applied to the web by contact with a dewatering felt and passage through a nip including a pressure roll and being adapted both for use in a dry condition or wet condition said paper product comprising the thermosettable wet strength resin of claim 1, the amount of the wet strength resin added being sufficient to produce an initial normalized CD wet strength of at least about 30 g/3 inch strip.

52. The absorbent paper produce of claim 51 in the form of a single or multi-ply towel.

53. The absorbent paper product of claim 51 in the form of a single or multi-ply napkin.

54. The absorbent product of claim 51 in the form of a single or multi-ply facial tissue.

55. The absorbent paper product of claim 51 in the form of a single or multi-ply bathroom tissue.

56. A cellulosic paperboard web comprising:

(a) predominantly cellulosic fibers and (b) the thermosettable wet strength resin of claim 1.

57. The cellulosic paperboard of claim 56 in the form of a dairy carton.

58. The cellulosic paperboard of claim 57 in the form of a paper bag.

59. An absorbent paper product comprising a cellulosic web adapted for use in a dry or wet condition said paper product comprising the thermosettable wet strength resin of claim 1, the amount of the wet strength resin added being sufficient to produce an initial normalized CD wet strength of at least about 30 g/3 inch strip.

60. The absorbent paper product of claim 59 in the form of a single or multi-ply towel.

61. The absorbent paper product of claim 59 in the form of a single or multi-ply napkin.

62. The absorbent product of claim 59 in the form of a single or multi-ply facial tissue.

63. The absorbent paper product of claim 59 in the form of a single or multi-ply bathroom tissue.

* * * * *